June 2, 1970 R. D. COPLEY ET AL 3,515,437
DISCHARGE DUCTS FOR COTTON HARVESTER
Filed April 18, 1968 3 Sheets-Sheet 1

INVENTORS
RUSSELL D. COPLEY &
ARTHUR L. HUBBARD
BY William A. Murray
ATTORNEY

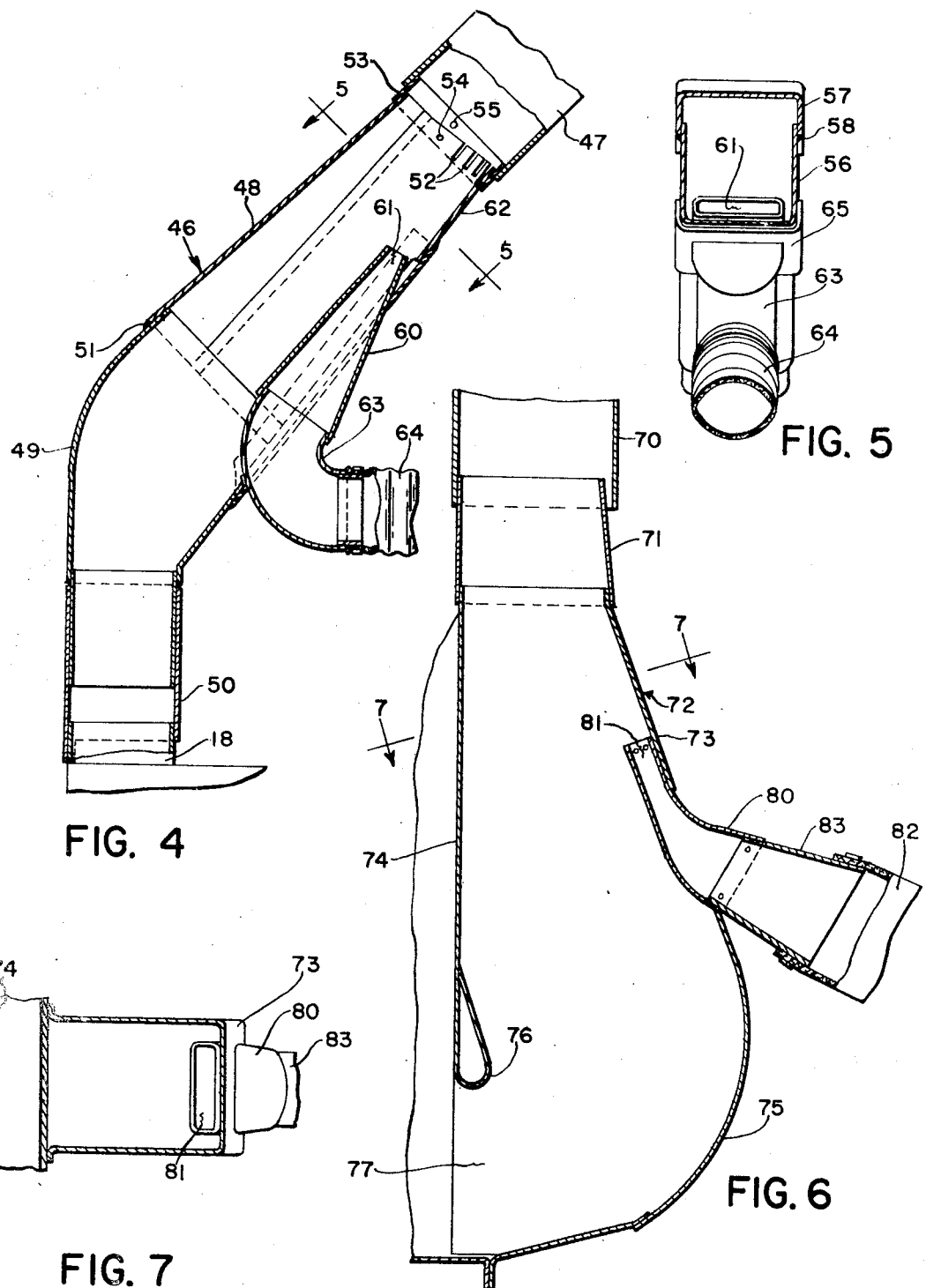

United States Patent Office  3,515,437
Patented June 2, 1970

3,515,437
DISCHARGE DUCTS FOR COTTON HARVESTER
Russell Dean Copley, Ankeny, and Arthur Lowell Hubbard, Des Moines, Iowa, assignors to Deere & Company, Moline, Ill., a corporation of Delaware
Filed Apr. 18, 1968, Ser. No. 722,405
Int. Cl. B65g 53/04
U.S. Cl. 302—59                     15 Claims

ABSTRACT OF THE DISCLOSURE

A discharge duct structure for a cotton harvester that includes upper, lower and intermediate portions with the upper and lower portions expanding to relatively large upper and lower ends respectively. Air is introduced into the lower portion by a blower duct that terminates relatively closely to the intermediate portion at a relatively high pressure and high velocity. The intermediate portion is relatively short so that the air issuing from the outlet may expand as it moves through the upper portion of the duct structure.

BACKGROUND OF THE INVENTION

This invention relates to duct structure for use with cotton harvester, with each of the duct structures being continuous and extending from the harvesting apparatus to the upper portion of a cotton container or basket. Still more particularly this invention relates to means of introducing air into the lower portions of the duct through an outlet directed upwardly so that cotton will be drawn through the duct structure to the outlet and from thence through the intermediate and upper portions of the duct structure to the basket.

In U.S. Pat. 3,378,309, issued to R. D. Copley and G. R. Sutherland, there is shown and described a method and structure for moving cotton from a cotton harvester to a picker or harvester basket. The structure includes an elongated single duct that extends from the top outer side of a harvester unit to the upper inlet portion of the basket. There is an elbow provided in the elongated duct at its midportion and air is introduced into the duct at the elbow and is directed toward the upper discharge end of the duct. As a result, a suction is created in the lower portion of the duct which draws the cotton from the harvester apparatus and moves it into the basket.

The problem with a structure such as is shown in the aforementioned patent is that the duct is relatively small in cross section throughout its length and is generally uniform in cross section throughout its length. Consequently the ability of the duct structure to move cotton is determined by the ability of the duct to pass cotton at an area in which air moves at its slowest velocity. Normally air will move in an expanding stream as it leaves the nozzle, although immediately adjacent the nozzle the stream will tend to contract. The contraction will occur for only a short distance and from there on it will tend to expand unless restricted. In the structure shown in the aforementioned patent, there is no advantage taken of the natural tendency of a stream of air to expand and consequently at the upper limits of the duct structure, the air is moving at a relatively slow rate and the overall capacity of the duct is dependent upon the amount of the cotton in the air moving through the upper portion.

SUMMARY OF THE INVENTION

With the above in mind, it is the primary object of the present invention to utilize a duct structure that extends from the harvesting apparatus upwardly and generally rearwardly to the inlet side of a cotton picker basket. The duct structure is composed of a central or intermediate portion and upper and lower portions that expand from the intermediate portion to an upper discharge end and a lower intake end respectively. Air is introduced by a nozzle in the lower portion at a position closely adjacent the intermediate portion and by an outlet that faces and is directed through the intermediate and upper portions. The upper portion has a major axis and the outlet for the blower duct or nozzle is elongated in the direction of the major axis. The intermediate portion is relatively short so that air leaving the nozzle outlet will have a natural tendency to expand in the direction of the major axis of the upper portion. Thus, the high velocity and high pressure airstream that leaves the nozzle will tend to create a suction in the lower portion of the duct which will move cotton upwardly and by the outlet where it will move in the stream of air leaving the outlet. As the air moves into the upper expanding portion of the duct structure, the velocity will be reduced but the overall capacity of the duct to move cotton will be increased due to its enlarged cross sectional area.

It is a further object of the invention to provide the upper, lower and intermediate portions to be separable and interconnected so as to articulate and telescope at their respective joints. The upper duct portion is pivotally carried on a fixed frame and consequently the articulation and telescoping joints will permit the harvesting units to be raised and lowered.

BRIEF DESCRIPTION OF THE DRAWINGS

FIG. 4 is a vertical sectional view of the lower section of the duct structure on the outer portions of the harvesting units.

FIG. 5 is a sectional view taken substantially along the line 5—5 of FIG. 4.

FIG. 6 is a side view of the lower portion of the duct structure that is positioned to receive cotton from the inner or rear harvesting units.

FIG. 7 is a sectional view taken substantially along the line 7—7 of FIG. 6.

DESCRIPTION OF THE PREFERRED EMBODIMENT

Figure 1:
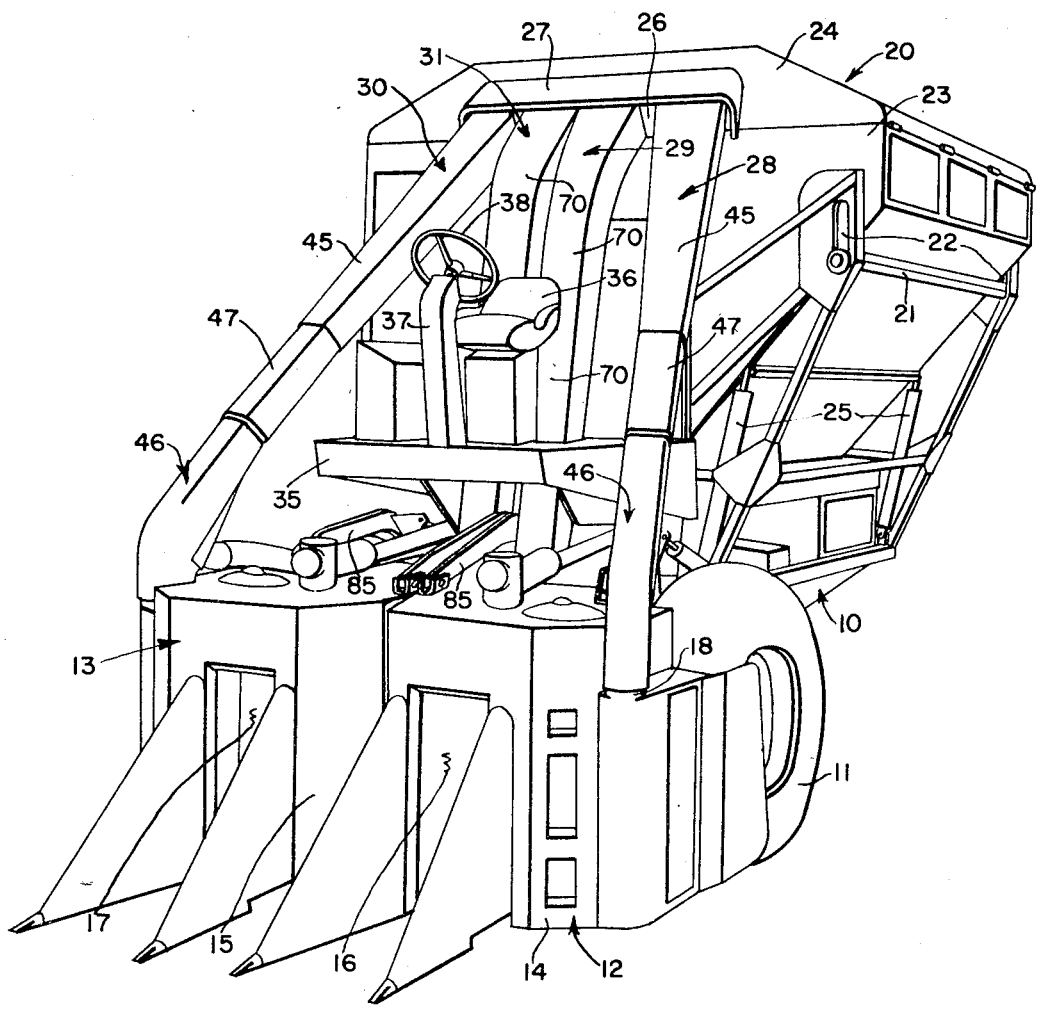
FIG. 1 is a front and left side perspective view of a cotton harvester utilizing the present invention.

The cotton harvester is of a self-propelled nature supported on a main tractor frame 10 having a pair of forward traction wheels, one of which is shown at 11, and a rear steerable wheel, not shown. The frame 10 supports at its forward end left- and right-hand harvesting apparatus 12, 13. The cotton apparatus 12, 13 are of conventional nature having housings 14, 15 that have plant passages 16, 17 for receiving adjacent rows of cotton plants. The harvesting mechanisms retained in the housings 14, 15 are of conventional nature having been generally described in previous patents such as U.S. Pat. 2,723,520 which issued to W. L. Hubbard Nov. 15, 1955 and U.S. Pat. 2,912,285 which issued to A. L. Hubbard Nov. 10, 1959. If details of the harvesting mechanism and internal construction of the housings 14, 15 are desired, such may be had by reference to these patents As is conventional, therefore, cotton is discharged at the outer forward sides of the respective harvesting apparatus 12, 13 and specifically at rounded duct-receiving collars 18. Also, cotton harvested inwardly of the respective passages 16, 17 is discharged at the rear inner portions of the respective housings 14, 15 in the manner and at the location set forth in the aforementioned patents.

Supported on the main frame 10 above the apparatus 12, 13 and laterally rearwardly thereof is a cotton picker basket or container 20. The basket 20 is supported on a fore-and-aft extending horizontal pivot shaft 21 carried in vertical slots 22 and includes a base or basket portion 23 and a lid portion 24. As is conventional in cotton harvesters, the basket, for purposes of discharge, is tilted about the pivot shaft 21 by means of hydraulic cylinders 25 while at the same time the lid 24 is caused to open by means of suitable linkage, not shown. Thus, for discharging the cotton, the cylinders 25 are extended and cotton is moved out over the left-hand upper edge of the basket 23. The lid 24 is provided with a forwardly positioned inlet 26 and a hood 27 that extends forwardly and above the opening 26. The opening is a transverse horizontally elongated slot that receives the upper discharge ends of duct structures 28, 29 moving cotton from the left-hand harvesting apparatus 12 and duct structures 30, 31 moving cotton from the right-hand harvesting apparatus.

Figure 2:
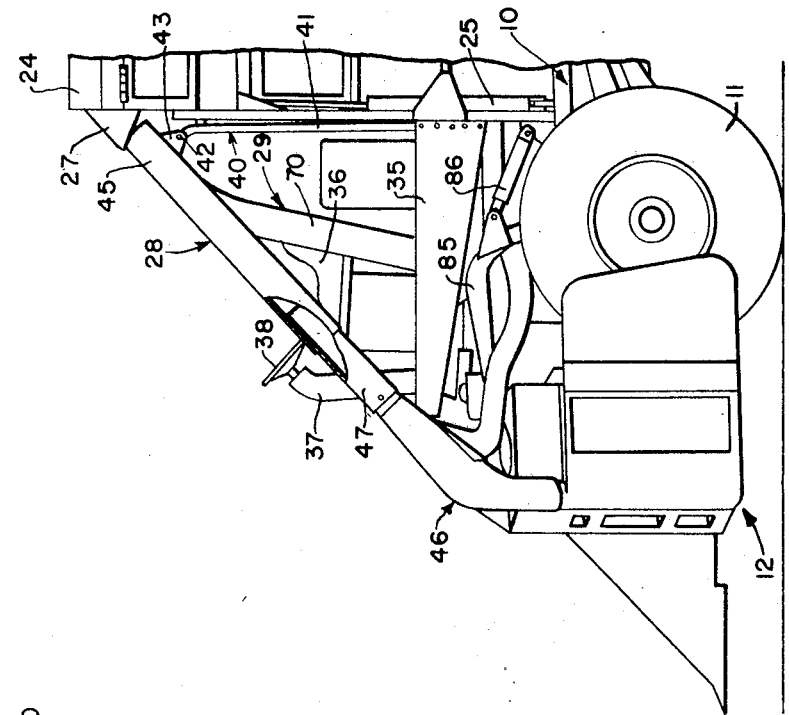
FIG. 2 is a side view of the front portion of the cotton harvester with the harvesting units being relatively closely spaced in respect to the ground.
Figure 3:
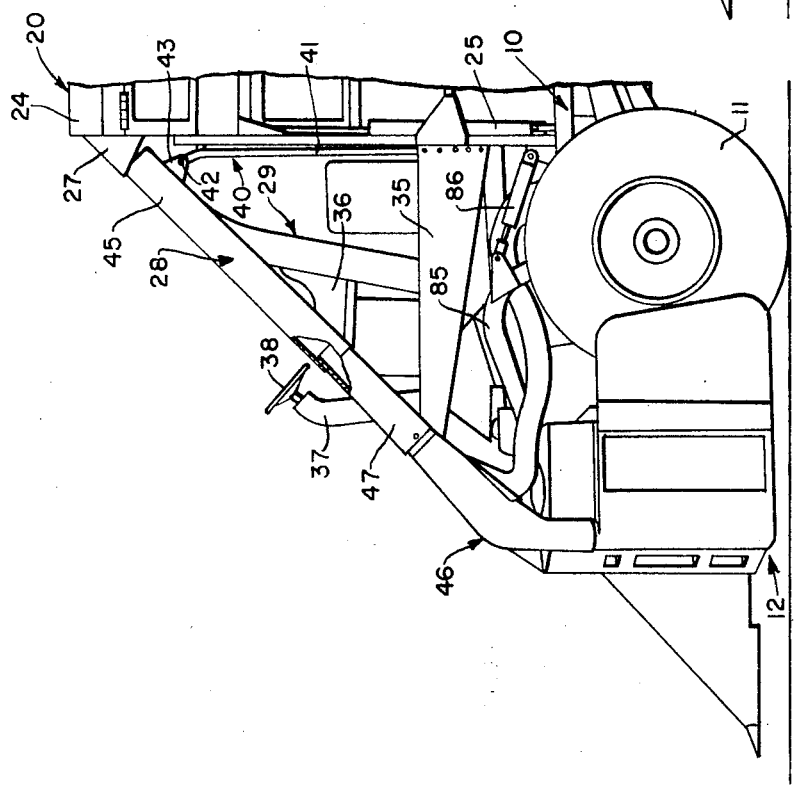
FIG. 3 is a view similar to FIG. 2 but showing the harvesting units in their raised position.

Supported also on the main frame 10 is a horizontal operator's platform that projects forwardly of the basket 20. It supports an operator's station as indicated by an operator's seat 36, a console 37 and steering wheel 38. Indirectly supported on the main frame 10 is an upright supporting structure 40 that includes a pair of transversely spaced upright structural elements 41 welded at their lower ends to the platform 35 and interconnected at their upper ends by a transverse pivot shaft 42. Each of the duct structures 28-31 has downwardly projecting brackets 43 that are carried on the pivvot rod or shaft 42. As may best be seen from viewing FIGS. 2 and 3, the pivot rod or shaft 42 is disposed closely adjacent the hood 27 and the inlet 26 of the basket 20. The brackets 43 are on the underside of the upper end portions of the structures 28-31.

The two outer structures 28, 30 are each composed of identical upper portions 45, lower portions 46, and intermediate portions 47. The upper portions 45 are rectangular in cross section and expand from a relatively small lower end to an upper wider discharge end disposed beneath the hood 27. As may best be seen from viewing FIGS. 1 and 2, the upper portions 45 have minor axes that remain substantially the same throughout their lengths and major axes that extend transversely and enlarge continuously from the lower to the upper ends. Thus, the lower ends of the upper sections 45 are substantially square in cross section whereas the upper ends are rectangular in cross section and are elongated in a transverse dimension.

Intermediate portions 47 of the structures 28, 30 are substantially square in cross section throughout their lengths. The upper ends of the intermediate sections 47 telescope into the lower ends of the upper sections 45.

The lower portions 46 are each composed of upper and lower parts 48, 49 respectively. The upper portion or part 48 is a downward continuation of the intermediate portion 47 and the lower part 49 is an elbow that extends from the part 46 downwardly to a vertical duct portion 50 that telescopes over the collar 18. The two parts 48, 49 are fixed to one another by welding 51. The upper end of the duct part 48 is slotted at 52 around its upper edge and a small rectangular-shaped collar 53 is pivotally carried at 54 on the upper end and around its outer surface. The collar 53 projects upwardly beyond the upper edge of the part 48 and into the lower end of the intermediate duct 47. Again the collar is pivoted at 55 to the intermediate portion 47 and consequently the collar 53 and two pivot joints 54, 55 define an articulated joint between the lower portion 46 and the intermediate portion 47 of the duct structure 28 or 30.

Referring now to FIG. 5, the part 46 is fabricated from two U-shaped panels 56, 57 that have their vertical legs welded to one another, as at 58. Consequently the two U-shaped panels 56, 57 form a substantially rectangular-shaped duct portion. Since the collar 53 fits into the square-sectioned intermediate portion 47, it is clearly evident that the upper end of the portion 48 is also substantially square in cross section. However, the duct portion 48 expands or enlarges in a downward direction until at its point of connection to the lower part 49 it has its maximum or largest cross sectional area. Again referring to FIG. 5, the section 48 has a minor axis extending transversely that is substantially equal to the transverse axis of the intermediate portion 47. It also has an expanding major axis in a fore-and-aft direction that enlarges from a relatively small end adjacent the intermediate section 47 to a relatively large end adjacent the juncture with the lower duct part 49. Thus it will be seen that the lower section 46 has its major axis transverse to the major axis of the upper section 45 and its minor axis transverse to the minor axis of the upper section 45. The axes of the intermediate portion 47 are, of course, equal to the two minor axes of the upper and lower portions.

The outer duct structures 28, 30 have air blown or introduced into the lower portions 46 by blower duct means that includes a spout 60 tapered from a relatively large end to an outlet 61 terminating adjacent but below the lower end of the intermediate portion 47 and facing the portion 47. The outlet 6 is elongated in the direction of the minor axis of the lower section 46 and is closely adjacent to the underside wall 62 of the upper part 48. As may best be seen in FIG. 5, the outlet 61 extends substantially the full width of the duct part 48. The lower end of the spout 60 is connected to an elbow 63, which in turn is connected to a flexible conduit 64 that extends over the respective picker housing to a blower, not shown, on the frame 10. Rigid with the spout 60 is a U-shaped flange 65 that fits on the underside 62 of the duct portion 48 and may be welded thereto so as to fix the spout 60 in the position shown in FIGS. 4 and 5. The duct structures 29, 31 include upper sections 70, intermediate sections 71 and lower sections 72. The upper section is rectangular in cross section with the major axis of the rectangle being in a transverse direction. As in the outer duct structures, the inner upper portions 70 expand in a transverse dimension upwardly from the intermediate portion 71. The intermediate portion 71, as in the previous or outer duct structure, is closer to being square in cross section. The section 71 telescopes internally of the lower end of the upper portion 70, and consequently there is permitted vertical movement between the sections 70, 71. The lower section 72 is composed of a rear wall 73 that diverges rearwardly from a front wall 74 to a lower arcuate portion 75. The front wall 74 has a lower edge 76 that forms with the forward continuation of the arcuate portion 75 a material intake opening 77 for receiving cotton into the lower section 72. The sides of the lower section 72 are substantially in vertical continuation with the vertical sides of the intermediate section 71.

A blower nozzle 80 is introduced through the rear wall 73 of the lower section 72 with the discharge outlet 81 being elongated in a transverse direction and extending substantially between the sides of the section 72. The outlet 81 is directed upwardly and enters into the duct system at a point relatively closely adjacent the intermediate portion 71. The nozzle 80 has a duct nipple 83 fixed to the nozzle 80 and extending outwardly for connection to a flexible duct 82 extending to the blower on the harvester, the blower not being shown.

The harvesting apparatus 12, 13 are provided with forwardly projecting lift arms 85 which are pivotally carried on the main frame 10. Hydraulic cylinders 86 are provided between the frame 10 and the respective arms 85 and operate upon extension and retraction thereof to raise and lower the respective harvesting apparatus 12, 13. By providing that the upper ends of the respective duct structures 28–31 are pivotally carried on the rod 82 at the upper portion of the support 40, there is permitted pivotal movement of the upper portions of the respective duct structures, but vertical movement of the upper ends is generally restricted. By providing the telescoping connection between the midportions 47 and upper portions 45, as is shown clearly in FIGS. 2 and 3, and by further providing the pivotal or articulated joints between the lower portions 46 and the intermediate portions 47, the outer duct structures 28, 30 are self-adjusting to accommodate vertical movement of the harvesting apparatus 12, 13. As may be seen from viewing FIGS. 2 and 3, the central duct structures 29, 31 are more nearly on a direct vertical and consequently the telescoping arrangement between the intermediate sections 71 and the upper sections 70 will permit the vertical adjustment of the row units 12, 13. While some minor fore-and-aft adjustments may be required between the sections 70, 71 such may be available due to the mere tolerances in the telescoping juncture and consequently there would be some articulation at the joint between 70, 71. Thus it may be seen that vertical adjustment of the units 12, 13 is easily compensated for through the articulated and telescoping joints in the respective duct structures 28–31.

The blower structure operates in the following manner. Air is introduced into the respective lower duct portions 46, 72 by the spouts 60, 80 respectively. The spouts 60, 80 force the air to be moved through the outlets 61, 81 at comparatively high pressures and high velocities, this being due to the forcing of the air into a converging-type nozzle. The outlets 61, 81 being elongated in the transverse direction will first move in a stream that is reduced slightly as it approaches the intermediate portions 47, 71 respectively. As the air continues to move through these intermediate portions, there will be a natural tendency for the air to expand. The minor axes of the respective upper portions 45, 70 will receive the stream of air in its narrow dimension. However, due to the transverse expansion of the upper sections 45, 70 the natural tendency for the air to expand in the transverse or major axes direction will be accommodated by the expansion of those upper sections. As air leaves the outlets 61, 81 the pressure of air at those outlets will create an induced flow of air by vacuum through the lower portion of the lower sections 46, 72 which will in effect draw the cotton that has been harvested in the harvesting apparatus 12, 13. The cotton will move upwardly through the respective lower sections 46, 72 and into the stream of air moving out of the outlets 61, 81. Once it is in the airstream the cotton will continue through the duct structures for discharge through the inlet 26. As the air moves through the wider or expanded upper portions of the respective duct structures, the velocity thereof will be reduced, but due to the enlarged cross section of the respective duct structures there will be sufficient capacity to handle all of the cotton received from the harvesting units.

We claim:

1. In a cotton harvester having a cotton harvesting apparatus, a cotton receptacle for receiving harvested cotton with a cotton inlet spaced above and laterally offset from the apparatus, the improvement residing in duct structure extending from the apparatus to the inlet comprising a lower section attached to and for receiving cotton from the apparatus, an upper section having an upper end for discharging cotton through the inlet and an intermediate section joining the lower and upper sections, the lower section having in cross section major and minor axes and the upper section having in cross section major and minor axes transverse to the major and minor axes respectively of the lower section, and the intermediate section having in cross section axes substantially equal to the minor axes of the lower and upper sections; a blower duct means having an opening discharging upwardly into the lower section and being closely adjacent a side at the end of the major axis, the duct opening being elongated in a direction parallel to the minor axis.

2. The structure as set forth in claim 1 in which the opening enters into the lower section at a point closely adjacent its juncture with the intermediate section.

3. The structure as set forth in claim 1 in which the upper and lower sections are substantially rectangular in cross section and the intermediate section is substantially square in cross section.

4. The structure as set forth in claim 1 in which the lower, intermediate and upper sections are aligned along an inclined axis, and the duct means is connected to and opens into the underside of the lower section.

5. The structure as set forth in claim 1 further characterized by the lower section being joined to the harvesting apparatus by a juncture section and the juncture section has a relatively small inlet and expands therefrom to the area of its junction with the lower section.

6. The structure as set forth in claim 1 in which the lower, intermediate and upper sections are pivotally and telescopingly joined so as to accommodate vertical movement of the harvesting apparatus.

7. In a cotton harvester having a cotton harvesting apparatus, a cotton receptacle for receiving harvested cotton with a cotton inlet spaced above and laterally offset from the apparatus, the improvement residing in a duct structure extending from the apparatus to the inlet including a relatively small intermediate portion, and upper and lower portions in juncture with the intermediate portion and expanding in cross section therefrom to upper and lower ends respectively that discharge cotton through the inlet and receive cotton from the harvesting apparatus; and a blower duct means fixed to the lower section and having a blower outlet beneath, closely adjacent to, facing and directed through the intermediate portion.

8. The structure as set forth in claim 7 in which the upper portion is supported on framework, the lower portion is connected to the harvesting apparatus, the intermediate, upper and lower portions are separable and are telescopingly and pivotally joined together so as to accommodate vertical movement of the harvesting apparatus.

9. The structure as set forth in claim 7 in which the blower means includes a tapered spout with the outlet being at the small end of the spout and air is introduced at a relatively low pressure into the spout and discharged at a comparatively high pressure and high velocity through the outlet.

10. The structure as set forth in claim 7 in which the upper and lower portions have in cross section major and minor axes with the respective major axes being transverse to one another whereby the upper portion shall expand in a direction normal to the direction of expansion of the lower portion.

11. The structure as set forth in claim 10 whereby the duct means terminate internally of the lower portion at the outlet and closely adjacent a side of the lower portion at the end of the respective major axis, and in which the outlet is elongated in the direction of the major axis of the upper portion.

12. The structure as set forth in claim 11 in which the intermediate portion is relatively short whereby the expanding upper portion will accommodate the normal expansion of the airstream leaving the outlet.

13. In a cotton harvester having a main frame and vertically adjustable cotton harvesting apparatus supported thereon, a cotton receptacle for receiving harvested cotton from the apparatus with a cotton inlet above and laterally offset from the apparatus, the improvement residing in upright supporting structure on the frame having an upper pivot closely adjacent the inlet; and a continuous duct structure having a lower intake end on the apparatus adapted to raise and lower in accordance with vertical adjustment of the apparatus and an upper discharge end carried on the pivot and directed through the inlet, the duct structure being composed of a plurality of interconnected duct elements with joint means between adjoining ends of the duct elements providing for angulation and telescoping between the elements, so as to accommodate vertical adjustment of the apparatus, and means mounting the duct structure on the pivot adjacent its upper discharge end.

14. The structure as set forth in claim 13 in which the interconnected ducts have at least two of said joint means, one of which is telescoping and the other of which is pivotal.

15. The structure as set forth in claim 13 in which air is blown through a nozzle fixed to and opening into the duct structure above its juncture with the apparatus, and further characterized by a blower supported on the frame and a flexible duct between the blower and nozzle for accommodating vertical movement between the nozzle and blower.

References Cited

UNITED STATES PATENTS

| | | | |
|---|---|---|---|
| 783,177 | 2/1905 | Cluff | 302—34 |
| 1,920,418 | 8/1933 | Meyercord et al. | 56—14 |
| 3,378,309 | 4/1968 | Copley et al. | 302—17 |

ANDRES H. NIELSEN, Primary Examiner